United States Patent
Wellwood

(10) Patent No.: US 12,551,922 B2
(45) Date of Patent: Feb. 17, 2026

(54) METHODS FOR COLD SPRAYING NICKEL PARTICLES ON A SUBSTRATE

(71) Applicant: NAC International Inc., Peachtree Corners, GA (US)

(72) Inventor: Jay G. Wellwood, Peachtree Corners, GA (US)

(73) Assignee: NAC International Inc., Peachtree Corners, GA (US)

( * ) Notice: Subject to any disclaimer, the term of this patent is extended or adjusted under 35 U.S.C. 154(b) by 25 days.

(21) Appl. No.: 18/779,178

(22) Filed: Jul. 22, 2024

(65) Prior Publication Data

US 2024/0383001 A1    Nov. 21, 2024

Related U.S. Application Data

(63) Continuation of application No. 18/306,478, filed on Apr. 25, 2023, now Pat. No. 12,042,818, which is a continuation of application No. 17/173,438, filed on Feb. 11, 2021, now Pat. No. 11,666,939.

(51) Int. Cl.
| | |
|---|---|
| *B05D 1/12* | (2006.01) |
| *B05B 7/14* | (2006.01) |
| *C23C 24/04* | (2006.01) |

(52) U.S. Cl.
CPC .............. *B05D 1/12* (2013.01); *B05B 7/1486* (2013.01); *C23C 24/04* (2013.01)

(58) Field of Classification Search
None
See application file for complete search history.

(56) References Cited

U.S. PATENT DOCUMENTS

| | | | |
|---|---|---|---|
| 4,481,165 A | 11/1984 | Anderson et al. | |
| 5,338,941 A * | 8/1994 | Sappok | G21F 5/00 250/496.1 |
| 10,099,322 B2 | 10/2018 | Widener et al. | |
| 2007/0137560 A1* | 6/2007 | Kim | C23C 24/04 118/300 |
| 2007/0153965 A1 | 7/2007 | Choi et al. | |
| 2013/0015308 A1 | 1/2013 | Ting | |
| 2014/0117109 A1 | 5/2014 | Widener et al. | |
| 2019/0039296 A1 | 2/2019 | Prasad et al. | |

FOREIGN PATENT DOCUMENTS

| | | |
|---|---|---|
| CA | 2567090 A1 | 4/2008 |
| FR | 2521337 A1 | 8/1983 |
| FR | 3027446 A1 | 4/2016 |
| RU | 2014142828 A | 5/2016 |

OTHER PUBLICATIONS

Fusco et al., Corrosion of Single Layer Thin Film Protective Coatings on Steel Substrates for High Level Waste Containers, Progress in Nuclear Energy 89, p. 159-169, 2016.
International Search Report issued for PCT/US2018/65995, dated Mar. 22, 2019.
Maev, "Low-Pressure Cold Spray (LPCS)", in Cold-Spray Coatings, 95-142, Cham: Springer International Publishing, Sep. 11, 2017, Web.
Luhn, "Corrosion and thermal processing in cold gas dynamic spray deposited austenitic stainless steel coatings", NAVAL Postgraduate School, Monterey CA, US, 2016.
Hardin, "Cask Design and Manufacture, and Waste Encapsulation", SAND2013-7865C, Sandia National Lab, 2013.
Koivuluoto, "Microstructure and mechanical properties of low-pressure cold-sprayed (LPCS) coatings", Journal of Thermal Spray Technology 17, No. 5-6 (2008): 721-727.
Moridi, "Cold spray coating: review of material systems and future perspectives", Surface Engineering 30, No. 6 (2014): 369-395.
Spencer, "The influence of Al2O3 reinforcement on the properties of stainless steel cold spray coatings", Surface and Coatings Technology 206, No. 14 (2012): 3275-3282.
Staff Memo—SONGS Inspection and Maintenance Program, prepared by Southern California Edison published Jun. 10, 2020.

* cited by examiner

*Primary Examiner* — Michael P. Rodriguez
(74) *Attorney, Agent, or Firm* — Thomas | Horstemeyer, LLP

(57) ABSTRACT

Described herein, are methods for providing a protective coating to a storage container for storing nuclear material, the method comprising depositing nickel particles on at least one surface of the substrate to produce the protective coating, wherein the nickel particles are deposited by cold spraying a composition comprising nickel particles and a carrier gas comprising nitrogen. In one aspect, the carrier gas consists essentially or consists only of nitrogen. The methods do not require pretreatment or modification of the nickel particles prior to cold spraying, which makes the methods described herein economically practical. The coatings produced by the methods described herein possess several advantageous properties including, but not limited to, high adhesion strength to the storage system and low porosity. The coatings produced by the methods described herein are effective against chemical attack such as, for example, CISCC.

20 Claims, No Drawings

METHODS FOR COLD SPRAYING NICKEL PARTICLES ON A SUBSTRATE

CROSS-REFERENCE TO RELATED APPLICATIONS

This application claims the benefit of and priority to co-pending U.S. Nonprovisional patent application Ser. No. 18/306,478, filed on Apr. 25, 2023, which claims the benefit of and priority to U.S. Nonprovisional patent application Ser. No. 17/173,438, filed on Feb. 11, 2021, the contents of which are incorporated by reference herein in their entireties.

BACKGROUND

Worldwide generation of nuclear energy is expected to grow from around 2.3 billion kilowatt hours in 2012 to about 4.5 billion kilowatt hours in 2040. In 2015, there were 448 nuclear power reactors in operation globally. Of the currently operating nuclear power plants, 99 are located in the United States, making it the largest nuclear power generating country in the world. Accordingly, the United States produces the greatest fraction of nuclear waste globally. The nuclear waste comprises very low-level ("VLLW"), low-level ("LLW"), intermediate-level ("ILW"), and high-level waste ("HLW") streams. The International Atomic Energy Agency estimates that, as of 2018, the total inventory for each of these waste streams was, respectively, 2,356,000 m$^3$, 3,479,000 m$^3$, 460,000 m$^3$, and 22,000 m$^3$. In addition to radioactive waste, other nuclear materials are produced for use in the research and medical industries. Accordingly, long-term storage of nuclear material in a safe manner is an ever-increasing need in the industry.

Nuclear fuel discharged from fission reactors, referred to hereinafter as Spent Nuclear Fuel ("SNF"), is typically stored in deep pools filled with water, with the water being provided to dissipate heat and to attenuate gamma and neutron radiation generated by the SNF. As an alternative to storing SNF in water-filled pools ("wet storage"), "dry storage" techniques also have been utilized. In a typical dry storage application, the SNF is stored in a substantially horizontal or substantially vertical configuration within a protective vessel, such as a "cask" or "overpack," which typically includes a heavy-walled structure. Additionally, the SNF may be stored in a thin-walled vessel (referred to hereinafter as a canister) which then may be placed into a cask. Such dry storage applications are widely viewed as possessing the necessary characteristics to enable economical long-term storage of SNF.

Chloride-induced stress corrosion cracking ("CISCC") is a type of degradation in certain types of stainless steel materials that results in cracks in the material. Although the phenomenon is very common in submerged water environments, CISCC can degrade materials in open-air environments as well. Three conditions must exist before CISCC can initiate and propagate on a surface of a stainless steel material: (a) the stainless steel material is of a type with metallurgical properties that make it susceptible to CISCC; (b) the presence of a tensile stress acting on the stainless steel material; and (c) the stainless steel material is located in an environment conducive to CISCC. In general, stainless steel materials that comprise an austenitic stainless steel, such as SAE type 304 and type 316 steel materials, are susceptible to CISCC. The presence of a tensile stress can be an active or a residual tensile stress. For example, stainless steel canisters for the storage of nuclear material, e.g., SNF, can have residual tensile stresses near welds in the canister body. With regard to the environmental conditions, factors that may lead to CISCC include the presence of chloride salts, e.g., NaCl, MgCl$_2$, and/or CaCl$_2$, a favorable temperature range, and a favorable relative humidity range.

Once the three basic conditions are met for CISCC, it is conceivable for CISCC to initiate on the surface of a stainless steel canister containing nuclear material, e.g., SNF. For example, chloride salts can absorb moisture from the air to form an aqueous chloride-rich solution (a process called deliquescence). The chloride-rich solution chemically can attack stainless steel material in regions of high tensile stress. For a given salt type, the absorption of moisture can occur only in specific ranges of temperature and relative humidity, and those ranges are different for each salt type. It is common for stainless steel canisters containing nuclear material, e.g., SNF, to be stored in open-air conditions in which the suitable temperature and relative humidity can occur.

CISCC is more likely to be initiated in a pre-existing crevice, crack, or flaw, such as a pit caused by localized corrosion. Once a crack has started, it will continue to advance through the crystalline structure of the stainless steel as long as the necessary conditions of temperature, tensile stress, and presence of a chloride-rich solution remain. Other factors affecting the initiation and progression of CISCC are the type of stainless steel used in fabricating the canister and the fabrication technique itself (e.g., amount of cold working, annealing). The process of CISCC can conceivably lead to pits and cracks that result in breach of stainless steel container.

Despite advances in research directed to maintaining the integrity of stainless steel canisters used for nuclear material storage systems, e.g., SNF, there remains a need for improved storage systems comprising protective barriers that enhance resistance to CISCC. Moreover, there is a need for methods to provide protective barriers that enhance resistance to CISCC in both the field, e.g., retroactively applied to existing nuclear material storage system containing nuclear material, and for new storage systems at the time of manufacture. Ideally, the protective barrier provided for enhanced resistance to CISCC would further provide enhanced resistance to general corrosion effects and would also not be a catalyst for galvanic corrosion. These needs and other needs are satisfied by the present disclosure.

SUMMARY

Described herein are methods for providing a protective coating to a storage container for storing nuclear material, the method comprising depositing nickel particles on at least one surface of the substrate to produce the protective coating, wherein the nickel particles are deposited by cold spraying a composition comprising nickel particles and a carrier gas comprising nitrogen. In one aspect, the carrier gas consists essentially or consists only of nitrogen. The methods do not require pretreatment or modification of the nickel particles prior to cold spraying, which makes the methods described herein economically practical. The coatings produced by the methods described herein possess several advantageous properties including, but not limited to, high adhesion strength to the storage system and low porosity. The coatings produced by the methods described herein are effective against chemical attack such as, for example, CISCC.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present disclosure is not entitled to antedate such publication by virtue of prior disclosure. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples and aspects encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise. Thus, for example, reference to "a coating," "a substrate," or "a canister," including, but not limited to, two or more such coatings, substrates, or canisters, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a coating refers to an amount that is sufficient to achieve the desired improvement in the property modulated by the formulation component, e.g., achieving the desired level of resistance to chloride-induced stress corrosion cracking ("CISCC"). The specific level in terms of wt % or thickness of a coating required as an effective amount will depend upon a variety of factors including the intended use environment, cost, degree of resistance to CISCC required, and end use of the storage system made using the disclosed methods.

As used herein, the term "nuclear material" includes nuclear fuel materials; spent nuclear fuel; fission products (including both direct and indirect fission products); nuclear fuel materials; fissile material; fissionable material; radioactive waste; radioactive materials; and any material containing an actinide, regardless of whether it can be used as a nuclear fuel. The term is meant to include materials that may be deemed as nuclear materials by the United States Atomic Energy Act of 1954. Nuclear material can include, but is not limited to, plutonium, uranium-233, uranium-235, uranium enriched in the uranium-233 or uranium-235 isotopes; as well as radioactive fission product nuclides such as, but not limited to, tritium, barium-130, cesium-141, zirconium-95, iodine-131, and iodine-125. Other examples of nuclear materials include spent fuel, depleted uranium, yellowcake, uranium dioxide, metallic uranium with zirconium and/or plutonium, thorium dioxide, thorianite, uranium chloride salts such as salts containing uranium tetrachloride and/or uranium trichloride.

As used herein the term "fissile material" is defined as any material fissionable by thermal (slow) neutrons. The three primary fissile materials are uranium-233 ($^{233}$U), uranium-235 ($^{235}$U) and plutonium-239 ($^{239}$Pu). U-238 ($^{238}$U) is fissionable by more energetic particles.

As used herein, "fissionable material" means any nuclide capable of undergoing fission when exposed to low-energy thermal neutrons or high-energy neutrons. In some instances, the term "fissionable" refers to materials in which fission may be induced by energies of about 20 MeV or less. Hence uranium-233 ($^{233}$U), uranium-235 ($^{235}$U), plutonium-239 ($^{239}$Pu), and U-238 ($^{238}$U) are "fissionable." Fissionable material includes any nuclide capable of undergoing fission when exposed to low-energy thermal neutrons or high-energy neutrons. Furthermore, fissionable material includes any fissile material, any fertile material or combination of fissile and fertile materials. A fissionable material may contain a metal and/or metal alloy. In one embodiment, the fuel may be a metal fuel. It can be appreciated that metal fuel may offer relatively high heavy metal loadings and excellent neutron economy, which is desirable for breed-and-burn process of a nuclear fission reactor. Depending on the application, fuel may include at least one element chosen from U, Th, Am, Np, and Pu. In one embodiment, the fuel may include at least about 90 wt. % U—e.g., at least 95 wt. %, 98 wt. %, 99 wt. %, 99.5 wt. %, 99.9 wt. %, 99.99 wt. %, or higher of U. The fuel may further include a refractory material, which may include at least one element chosen from Nb, Mo, Ta, W, Re, Zr, V, Ti, Cr, Ru, Rh, Os, Ir, and Hf. In one embodiment, the fuel may include additional burnable poisons, such as boron, gadolinium, or indium. In addition, a metal fuel may be alloyed with about 3 wt. % to about 10 wt. % zirconium to dimensionally stabilize the fuel during irradiation and to inhibit low-temperature eutectic and corrosion damage of the cladding.

The term 'fission product' as used herein refers to those elements formed as direct products (or so-called 'fission fragments') in the fission of nuclear fuel and products formed from such direct products by beta decay or internal transitions. Fission products include elements in the range from selenium to cerium. Fission products include elements in the range from selenium to cerium including elements such as $_{56}$Ba, $_{40}$Zr and $_{52}$Te, $_{55}$Cs and $_{58}$Ce.

As used herein, a "direct fission product" refers to an atom that remains after fission of a fissile atom.

As used herein, an "indirect fission product" refers to a decay daughter, grand-daughter, etc., that results from the radioactive decay of a direct fission product. However, at any given point in time, some quantity of a particular species fission product compound, such as $^{99}$Mo, will be a direct product and the remaining quantity will be indirect products, as there can be multiple decay chains at work.

As used herein, "nuclear fuel material" is intended to cover the various materials used as nuclear fuels for nuclear reactors including ceramic compounds such as oxides of uranium, plutonium and thorium with particularly preferred compounds being uranium oxide, plutonium oxide, thorium oxide and mixtures hereof.

As used herein, "radioactive material" refers to any substance that gives off various types of radiation in the form of electrons, neutrons, protons, alpha-particles, high energy-photons, gamma rays, or a mixture of two or more of these.

Alpha radioactivity, a positively charged particle, corresponds to the emission of a helium nucleus, a particularly stable structure consisting of two protons and two neutrons, called an alpha particle. Beta radioactivity corresponds to the transformation, in the nucleus: either of a neutron into a proton characterized by the emission of an electron (e–) or of a proton into a neutron, characterized by the emission of an anti-electron or positron (e+). It only appears in artificial radioactive nuclei produced by nuclear reactions. Gamma radioactivity, unlike the other two, is not related to a transmutation of the nucleus. It results in the emission, by the nucleus, of an electromagnetic radiation. Gamma radioactivity can occur by itself or together with alpha or beta radioactivity.

As used herein, "radioactive waste" refers to waste that contains radioactive material. Radioactive waste is typically a by-product of nuclear power generation, or is produced from the use of radioactive materials in scientific research, industrial, agricultural and medical applications, and the production of radiopharmaceuticals. Furthermore, in the mining industry, radioactive waste arises from naturally occurring radioactive materials (NORM) that are concentrated as a result of the processing or consumption of coal, oil and gas, and some minerals. For example, coal contains a small amount of radioactive uranium, barium, thorium and potassium, and residues from the oil and gas industry often contain radium and its decay products. In some instances, radioactive waste can refer to material containing the unusable radioactive by-products of the scientific, military, medical and industrial applications of nuclear energy.

As used herein, "low-level radioactive waste" refers to low level radioactive material as defined by Nuclear Regulatory Commission Regulations ("NRC") set forth in 10 CFR 61. Low level radioactive wastes do not include spent nuclear fuel, transuranic waste or byproduct materials which are defined as high-level radioactive wastes in § 11 e(2) of the Atomic Energy Act of 1954 at 43 U.S.C. 2014 (e). Low-level radioactive wastes ("LLW") include radioactive material found in evaporator concentrate, ion exchange resins, incinerator bottom ash, filtration sludges, and contaminated filters and membranes. Cs-137, Co-57 and Sb-125 are common radioactive constituents.

As used herein, "radioactive high level waste" refers to radioactive material which has a half-life in excess of 200,000 years. High level waste (HLW) is typically produced by nuclear reactors. It contains fission products and transuranic elements generated in the reactor core. HLW has high levels of activity that generate significant quantities of heat by radioactive decay that need to be considered in the design of a disposal facility. Disposal in deep, stable geological formations usually several hundreds of meters below the surface is generally recognized as the most appropriate option for HLW. The two primary classes of civilian HLW are used fuel from nuclear power reactors and separated waste arising from the reprocessing of that used fuel.

As used herein, the term "pre-service unit" means a storage system, canister, cask or container for storing nuclear material at or immediately following the time of fabrication of the system or container such that the system or container has not been previously used or currently used to store nuclear material.

As used herein, the term "in-service unit" means a storage system, canister, cask or container for storing nuclear material after fabrication of the system or container, post fabrication, such that the system or container has been loaded, at least in part, with nuclear material and in the monitored storage phase of the system or container life cycle.

As used herein, reference to an SAE steel grade, e.g., 316, is inclusive of the referenced grade and any sub-types or derivatives thereof, e.g., reference to grade 316 is inclusive of 316, 316F, 316L, 316N, and 316Ti, unless otherwise specified.

As used herein, the terms "optional" or "optionally" means that the subsequently described event or circumstance can or cannot occur, and that the description includes instances where said event or circumstance occurs and instances where it does not.

Defined herein throughout are various abbreviations, which include the following: (a) "CISCC" stands for "Chloride-Induced Stress Corrosion Cracking"; and (b) "SNF" stands for "Spent Nuclear Fuel."

Unless otherwise specified, temperatures referred to herein are based on atmospheric pressure (i.e. one atmosphere).

Described herein are methods for providing a protective coating to a storage system for storing nuclear material, the method comprising depositing nickel particles on at least one surface of the substrate to produce the protective coating, wherein the nickel particles are deposited by cold spraying a composition comprising nickel particles and a carrier gas comprising nitrogen.

The methods described herein involve the use of cold spray technology for applying nickel particles on a storage system. In cold spray technology, which is also referred to herein as "cold spray", particles are mixed with a carrier gas and the carrier gas and particles are subsequently accelerated into a supersonic jet, while the carrier gas and particles are maintained at a sufficiently low temperature to prevent melting of the particles. Typically, cold spray methods use a spray gun that receives a high-pressure carrier gas such as, for example, helium, nitrogen, or air, and a feedstock of deposit material in powder form. The powder granules are introduced at a high pressure into a gas stream in the spray gun and emitted from a nozzle. The particles are accelerated to a high velocity in the gas stream that may reach a supersonic velocity. The gas stream may be heated. Typically, the carrier gas is heated to less than the melting point of the particles to minimize in-flight oxidation and phase changes in the deposited material.

Cold spraying higher temperature materials such as nickel require higher velocities to produce high quality deposits. The selection of the carrier gas can affect the efficiency of the cold spraying process. It would be desirable for the carrier gas to be nitrogen, as nitrogen is an inexpensive and abundant inert gas. However, even high temperature nitrogen gas is difficult to accelerate to velocities fast enough to make dense deposits of high-melting point materials such as nickel using the cold spray process. In order to have sufficient velocity to make dense deposits of the high-melting point materials like nickel using the cold spray process, helium gas is favored compared to the conventional nitrogen gas. However, the use of helium gas for cold spraying is commercially challenging, as helium supply and costs can fluctuate over time.

It has been discovered that nickel particles can be efficiently deposited on the surface of storage systems using the cold spray process with nitrogen as the carrier gas. The methods do not require pretreatment or modification of the nickel particles prior to cold spraying, which makes the methods described herein economically practical. For example, the nickel particles are not pre-heated prior to cold spraying in order to change the microstructure and/or morphology of the particles. An example of pre-heat treatment involves applying a solution treatment (i.e., "solutionized"), wherein the particles are heated above the solvus temperature of the particles, followed by subsequent quenching and heating below the solvus temperature. These pre-heating steps add significant costs to the overall process for coating storage systems using cold spraying. The methods described herein circumvent unnecessary pre-heating steps.

The nickel particles are introduced into the cold spray device. In one aspect, the nickel particles are a powder. In one aspect, the nickel particles have a purity of at least about 99%, or about 99.1%, 99.2%, 99.3%, 99.4%, 99.5%, 99.6%, 99.7%, 99.8%, 99.9%, or 100%. In certain aspects, the nickel particles may include purities such as, for example, carbon, iron, oxygen, or sulfur.

The size of the nickel particles can vary. In one aspect, the nickel particles have a Fisher size of from about 10 microns to about 500 microns, or about 10 microns, 20 microns, 30 microns, 40 microns, 50 microns, 60 microns, 70 microns, 80 microns, 90 microns, 100 microns, 125 microns, 150 microns, 175 microns, 200 microns, 225 microns, 250 microns, 275 microns, 300 microns, 325 microns, 350 microns, 375 microns, 400 microns, 425 microns, 450 microns, 475 microns, or 500 microns, where any value can be a lower and upper endpoint of a range (e.g., 10 microns to 40 microns). In one aspect, the nickel particles have a mesh size less than or equal to 250.

In one aspect, the nickel particles have a d10 size distribution as determined by a Mastersizer 3000E particle size analyzer of about 1 micron to about 15 microns, or about 1 micron, 2 microns, 3 microns, 4 microns, 5 microns, 6 micron, 7 microns, 8 microns, 9 microns, 10 microns, 11 microns, 12 microns, 13 microns, 14 microns, or 15 microns, where any value can be a lower and upper endpoint of a range (e.g., 9 microns to 13 microns). In another aspect, the nickel particles have a d50 size distribution as determined by a Mastersizer 3000E particle size analyzer of about 10 microns to about 25 microns, or about 10 microns, 11 microns, 12 microns, 13 microns, 14 microns, 15 micron, 16 microns, 17 microns, 18 microns, 19 microns, 20 microns, 21 microns, 22 microns, 23 microns, 24 microns, or 25 microns, where any value can be a lower and upper endpoint of a range (e.g., 18 microns to 22 microns). In another aspect, the nickel particles have a d90 size distribution as determined by a Mastersizer 3000E particle size analyzer of about 30 microns to about 45 microns, or about 30 microns, 31 microns, 32 microns, 33 microns, 34 microns, 35 micron, 36 microns, 37 microns, 38 microns, 39 microns, 40 microns, 41 microns, 42 microns, 43 microns, 44 microns, or 45 microns, where any value can be a lower and upper endpoint of a range (e.g., 36 microns to 42 microns).

In certain aspects, the nickel particles as used herein can optionally include one or more hard phase powder material. In one aspect, the one or more hard phase powder material can comprise one or more ceramic, metal oxide, ceramic/metal composite, ceramic/ceramic composite materials, or combinations thereof. Exemplary, but non-limiting ceramic and metal oxides suitable for use in the hard phase material include a zirconia ($ZrO_2$), alumina ($Al_2O_3$), $Al_2O$, $Cr_2O_3$, $TiO_2$, $Cr_3C_2$, TiC, SiC, or combinations thereof. Exemplary, but non-limiting, ceramic/metal composite materials include WC/Co, $Cr_3C_2$/NiCr and TiC/Fe. Exemplary, but non-limiting, ceramic/ceramic composite materials include yttria-stabilized zirconia ("YSZ"), zirconia-toughened alumina ("ZTA"), $Al_2O_3$/$TiO_2$, $ZrO_2$/$Y_2O_3$, $ZrO_2$/$Y_2O_3$—$Al_2O_3$, $Cr_2O_3$/$SiO_2$, and combinations thereof.

In various aspects, the nickel particles in the form of a powder and the one or more hard phase powder material can be blended together into a powder mixture which is used with the carrier gas and directed through a suitable nozzle. In other aspects, the compatible metal powder and the one or more hard phase powder material are not pre-mixed and are separately introduced to the carrier gas and directed through a suitable nozzle. In a further aspect, the carrier gas, the compatible metal powder and the one or more hard phase powder material are each directed into a chamber prior to directing through a suitable nozzle.

In one aspect, the one or more hard phase powder material used in the ballistic impingement process comprises particles has an average size in the longest dimension of from about 5 microns to about 100 microns, about 5 microns to about 90 microns, about 5 microns to about 85 microns, about 5 microns to about 80 microns, about 5 microns to about 75 microns, about 5 microns to about 70 microns, about 5 microns to about 65 microns, about 5 microns to about 60 microns, about 5 microns to about 55 microns, about 5 microns to about 50 microns, about 5 microns to about 45 microns, about 5 microns to about 40 microns, about 5 microns to about 35 microns, about 5 microns to about 30 microns, about 5 microns to about 25 microns, about 5 microns to about 20 microns, about 5 microns to about 15 microns, about 5 microns to about 10 microns, about 10 microns to about 100 microns, about 10 microns to about 90 microns, about 10 microns to about 85 microns, about 10 microns to about 80 microns, about 10 microns to about 75 microns, about 10 microns to about 70 microns, about 10 microns to about 65 microns, about 10 microns to about 60 microns, about 10 microns to about 55 microns, about 10 microns to about 50 microns, about 10 microns to about 45 microns, about 10 microns to about 40 microns, about 10 microns to about 35 microns, about 10 microns to about 30 microns, about 10 microns to about 25 microns, about 10 microns to about 20 microns, about 10 microns to about 15 microns, about 20 microns to about 100 microns, about 20 microns to about 90 microns, about 20 microns to about 85 microns, about 20 microns to about 80 microns, about 20 microns to about 75 microns, about 20 microns to about 70 microns, about 20 microns to about 65 microns, about 20 microns to about 60 microns, about 20 microns to about 55 microns, about 20 microns to about 50 microns, about 20 microns to about 45 microns, about 20 microns to about 40 microns, about 20 microns to about 35 microns, about 20 microns to about 30 microns, about 20 microns to about 25 microns, any range or sub-range of values within the foregoing range, or any set of discrete values within the foregoing ranges. In other aspects, the one or more hard phase powder material particles have a shape that is substantially ellipsoid, spherical, irregular, or combinations thereof.

As discussed above, the methods described herein do not require the use of helium as the primary component of the carrier gas. In one aspect, the carrier gas includes at least 50% by volume nitrogen. In one aspect, the carrier gas includes at least 50% by volume nitrogen, at least 50% by volume nitrogen, at least 50% by volume nitrogen, at least 50% by volume nitrogen, at least 55% by volume nitrogen, at least 60% by volume nitrogen, at least 65% by volume nitrogen, at least 70% by volume nitrogen, at least 75% by volume nitrogen, at least 80% by volume nitrogen, at least 85% by volume nitrogen, at least 90% by volume nitrogen, at least 95% by volume nitrogen, or at least 99% by volume nitrogen. In one aspect, the carrier gas consists essentially of nitrogen. In another aspect, the carrier gas consists of nitrogen (i.e., 100%). In certain aspects, when the carrier gas includes nitrogen and a second gas, the second gas can be helium.

The temperature and pressure of the carrier gas in the cold spray device can vary. In one aspect, the temperature of the carrier gas is from about 800° C. to about 1,200° C., or about 800° C., 850° C., 900° C., 950° C., 1,000° C., 1,050° C., 1,100° C., 1,150° C., or 1,200° C., where any value can be a lower and upper endpoint of a range (e.g., 850° C. to 950° C.). In one aspect, the pressure of the carrier gas is from about 1 MPa to about 10 MPa, or about 1 MPa, 1.5 MPa, 2 MPa, 2.5 MPa, 3 MPa, 3.5 MPa, 4 MPa, 4.5 MPa, 5 MPa, 6 MPa, 6.5 MPa, 7 MPa, 7.5 MPa, 8 MPa, 8.5 MPa, 9 MPa, 9.5 MPa, or 10 MPa, where any value can be a lower and upper endpoint of a range (e.g., 3.5 MPa to 4.5 MPa).

A variety of different systems and equipment can be used to perform the methods described herein. The cold spray system can include any suitable equipment configured to perform a material deposition process in which relatively small powder particles that are in the solid state are accelerated to a relatively high velocity and applied to a surface of a substrate (or piston) to produce a layer of the powder that is adhered thereto. For example, the system used can include a pressurized gas source, a gas heater, a coating powder feeder and a nozzle. In various aspects, gas from the pressurized gas source is fed to the gas heater, where it can be heated. Alternatively, the pressurized gas can be heated to the required temperature within the pressurized gas source, after mixing with the nickel particles (e.g., powder), within the nozzle, or at another location within the system. The heater is preferably an electric heater, such as those commercially available in the field. Pressurized gas from the gas source can also be fed to the coating powder feeder, where stainless steel metal powder is mixed into the gas stream. Alternatively, the coating powder feeder can have its own pressurized gas source associated therewith. Typical powder feed rates are between about 10 and about 30 lbs/hr and the combined flow rate of the pressurized gas source to the heater and the powder feeder should typically be about 30 to 100 ft$^3$/min.

The pressurized gas stream containing the nickel particles can then be fed to the nozzle. The nozzle is used to focus the gas stream containing the nickel particles and direct it toward the substrate surface in the form of a stream, or spray, of particles traveling at supersonic speeds. In one aspect, the particle velocity can be within the range of 300 to 1500 m/sec. Upon impacting the substrate surface, the particles are deposited by means of ballistic impingement to form a coating. Formation of the coating through this method involves mechanical mixing of the particles of the coating with the substrate material at the interface. Examples of cold spray systems useful herein include, but are not limited to those of Plasma Giken (P CS-100), VRC Metal Systems (Gen III, VRC Viper), ASB Industries, Inc., and Centerline Ltd.

The thickness of the coating applies to the substrate can be modified to provide the desired protection, shielding, or resistance to chemically induced degradation of a substrate or surface, e.g., CISCC. In one aspect, the coating thickness applied is about 1 micron to about 1 mm, or about 1 micron, 10 microns, 20 microns, 30 microns, 40 microns, 50 microns, 60 microns, 70 microns, 80 microns, 90 microns, 100 microns, 150 microns, 200 microns, 250 microns, 300 microns, 350 microns, 400 microns, 450 microns, 500 microns, 550 microns, 600 microns, 650 microns, 700 microns, 750 microns, 800 microns, 850 microns, 900 microns, 950 microns, or 1 mm, where any value can be a lower and upper endpoint of a range (e.g., 50 microns to 150 microns). It is understood that a desired coating thickness can be provided in a single layer or as the aggregate coating thickness provided by multiple layers. A layer can be deposited in a single pass of a cold spray process.

In certain aspects, the surface of the substrate is cleaned prior to depositing the nickel particles. In one aspect, the surface of the substrate can be cleaned by blasting the surface. In one aspect, the substrate is cleaned by delivering the heated carrier gas via the nozzle at the prescribed distance from the substrate. In this aspect, the velocity of the heated gas removes surface contaminants as well as preheats the substrate, which improves the adhesion of the nickel particles to the substrate surface when applied by cold spraying. In other aspects, the surface of the substrate can be wiped with an organic solvent (e.g., an alcohol).

The protective coatings produced by the methods described herein have unique properties with respect to protecting a substrate from chemical attack or degradation. One such property is the protective coatings have very good adhesion to the substrate. By increasing the adhesion of the protective coating to the substrate surface, the surface will be protected for extended periods of time without the risk of the coating being removed from the surface. In one aspect, the protective layer has a coating adhesion strength of at least about 9,000 psi as determined by ASTM C633. In another aspect, the protective layer has a coating adhesion strength of about 9,000 psi to about 20,000 psi as determined by ASTM C633, or about 9,000 psi, 9,500 psi, 10,000 psi, 10,500 psi, 11,000 psi, 11,500 psi, 12,000 psi, 12,500 psi, 13,000 psi, 13,500 psi, 14,000 psi, 14,500 psi, 15,000 psi, 15,500 psi, 16,000 psi, 16,500 psi, 17,000 psi, 17,500 psi, 18,000 psi, 18,500 psi, 19,000 psi, 19,500 psi, or 20,000 psi, where any value can be a lower and upper endpoint of a range (e.g., 9,500 psi to 12,000 psi).

The protective coatings produced by the methods described herein also have reduced porosity. By reducing the porosity of the protective coating, the coating is susceptible or vulnerable to chemical agents such as, for example, water and salts from impregnating the coating, which reduces or prevents the likelihood of chemical degradation by the chemical agents. In one aspect, the protective layer has an area percentage porosity of less than or equal to 3% as determined by ASTM E2109. In another aspect, the protective layer has an area percentage porosity of about 0.1% to about 3% as determined by ASTM E2109, or about 0.1%, 0.25%, 0.5%, 0.75%, 1.0%, 1.25%, 1.5%, 1.75%, 2.0%, 2.25%, 2.5%, 2.75%, or 3.0%, where any value can be a lower and upper endpoint of a range (e.g., 0.5% to 2.5%).

In another aspect, the protective coatings produced by the methods described herein also exhibit a peening effect that can reduce or eliminate surface tensile stress in the substrate to be coated. Peening reduces or relieves tensile stress present in the substrate to be coated. Not wishing to be bound by theory, by reducing the tensile strength in the substrate, the protective coatings produced herein can reduce the likelihood of chemical degradation (e.g., CISCC) of the coated substrate.

In certain aspects, the protective coating applied to the substrate using the methods described herein can optionally be further processed. In one aspect, the protective coating can be sanded using techniques known in the to produce a smooth surface (e.g., no edges, holes, or cracks). Not wishing to be bound by theory, smoothing the surface of the protective coating can reduce the risk of corrosion of the coating.

The protective coatings described herein are useful in preventing or reducing chemical degradation of a substrate. The degradation can be caused by chemical agents present in the environment or location at which the substrate is present. For example, if the substrate is to be placed in water for extended periods of time, water and any components present in the water such as, for example, salts can degrade the substrate. In other aspects, when the substrate is located out I the open, oxygen and atmospheric water can degrade the substrate over time. The coating compositions described herein are effective in reducing or prevention chemical degradation of the substrate.

In one aspect, the substrate to be coated is a storage container. In another aspect, the storage container is for the storage of SNF. In another aspect, the storage container is for the storage relating to any nuclear material as defined herein, including radioactive-fissile materials which may be naturally radioactive and/or radioactive due to the occurrence of a fission event(s).

In various aspects, the storage container for storing nuclear material comprises a storage unit, e.g., a new storage system, canister, cask or container. In some aspects, the disclosed storage container for storing nuclear material is for storing radioactive waste, fission products, spent nuclear fuel, nuclear fuel material, fissile material, or combinations thereof. The disclosed storage container having a wall with an outer surface, an inner surface, and an open end.

In various aspects, the methods described herein can be used to provide a coating on a storage unit, e.g., a new storage system, canister, cask or container, for nuclear material such that the coating provides protection or otherwise shields a metal substrate in the storage unit from chemical or corrosive attack, e.g., chemical attack such as chloride-induced stress corrosion cracking ("CISCC"). In a further aspect, the methods described herein can be used to provide a coating to a storage unit for nuclear material that is a pre-service unit, e.g., a new storage system, canister, cask or container that has been newly manufactured or in which nuclear material has not been previously stored therein. In other aspects, the methods described herein can be used to provide a coating to a storage unit for nuclear material that is an in-service unit, e.g., a storage system, canister, cask, or container that has been loaded, at least in part, with nuclear material and is in the monitored phase of the system life cycle.

In various aspects, the methods described herein can be used as a field additive manufacturing process to build up an area on a storage system, canister, cask, or container, e.g., to provide protection or otherwise shield a substrate or surface to chemical attack, e.g., CISCC. In some instances, the methods described herein can be used to build up the substrate thickness in order to provide protection or otherwise shield a substrate or surface to chemical attack, e.g., CISCC. In a further aspect, the methods described herein can further comprise machining a substrate surface to a desired thickness or contour, either before or after the field additive manufacturing process.

The substrate to coated by the methods described herein may be provided in the form of one or more surfaces of various storage canisters, casks, or containers and/or canister, cask, or container inserts which are adapted for the storage of nuclear materials as defined herein. The storage system, canister, cask, or container can be a pre-service unit or in-service unit. The storage system, canister, cask, or container can be fabricated from a stainless steel, a ductile iron, a carbon steel, or combinations thereof. These materials can be in the form of sheets or other convenient forms for fabrication into a desired canister, cask, or container. The canister, cask, or container can be of a welded or bolted construction. In some aspects, the lid of the canister, cask, or container can be bolted or welded to thereon. Thus, the substrate may include structural and/or criticality control components utilized in storage containers and/or container inserts. For example, suitable SNF storage containers are described, but not limited to, those described in U.S. Pat. Nos. 6,544,606 and 6,784,443.

In one aspect, the substrate comprises a stainless steel, such as, but not limited to, an austenitic general purpose stainless steel, an austenitic chromium-nickel-manganese alloy, austenitic chromium-nickel alloy, a ferritic and martensitic chromium alloy, a heat-resisting chromium alloy, an austenitic steel strengthened by hot/cold work, or an austenitic super-alloy. In a further aspect, the compatible metal powder material comprises a powdered stainless steel, such as, but not limited to, SAE stainless steel 102, 201, 202, 205, 254, 302, 302B, 303, 303Se, 304, 304Cu, 304L, 304LN, 304N, 305, 308, 309, 310, 310S, 314, 316, 316F, 316L, 316N, 316Ti, 317, 317L, 321, 329, 330, 347, 348, 384, 405, 409, 410, 414, 416, 416Se, 420, 420F, 422, 429, 430, 431, 440A, 440B, 440C, 430F, 430FSe, 434, 436, 442, 446, 501, 502, any 600 series steel grade, any 900 series steel grade or combinations thereof.

ASPECTS

Aspect 1. A method for providing a protective coating to a storage system for storing nuclear material, the method comprising depositing nickel particles on at least one surface of the substrate to produce the protective coating, wherein the nickel particles are deposited by cold spraying a composition comprising nickel particles and a carrier gas comprising nitrogen.

Aspect 2. The method of aspect 1, wherein the carrier gas comprises at least 50% by volume nitrogen.

Aspect 3. The method of aspect 1, wherein the carrier gas consists essentially of nitrogen.

Aspect 4. The method of aspect 1, wherein the carrier gas consists of nitrogen.

Aspect 5. The method of any one of aspects 1 to 4, wherein the nickel particles are at least 99% pure nickel.

Aspect 6. The method of any one of aspects 1 to 4, wherein the nickel particles are at least 99.5% pure nickel.

Aspect 7. The method of any one of aspects 1 to 6, wherein the nickel particles have a Fisher size of about 10 μm to about 500 μm.

Aspect 8. The method of any one of aspects 1 to 7, wherein the nickel particles are not pretreated prior to depositing the particles on the surface of the substrate.

Aspect 9. The method of any one of aspects 1 to 8, wherein the protective coating has a thickness of about 1 μm to about 1 mm.

Aspect 10. The method of any one of aspects 1 to 9, wherein the carrier gas has a temperature of from about 800° C. to about 1,200° C.

Aspect 11. The method of any one of aspects 1 to 10, wherein the carrier gas has a pressure of from about 1 mPa to about 10 mPa.

Aspect 12. The method of any one of aspects 1 to 11, wherein the protective layer has a coating adhesion strength of at least about 9,000 psi as determined by ASTM C633.

Aspect 13. The method of any one of aspects 1 to 12, wherein the protective layer has an area percentage porosity of less than or equal to 3% as determined by ASTM E2109.

Aspect 14. The method of any one of aspects 1 to 13, wherein the surface of the substrate is cleaned prior to depositing the nickel particles.

Aspect 15. The method of any one of aspects 1 to 14, wherein after depositing the protective coating on the substrate, sanding the protective coating to produce a smooth coating.

Aspect 16. The method of any one of aspects 1 to 15, wherein the storage system is a storage system for storing radioactive waste, fission products, spent nuclear fuel, nuclear fuel material, fissile material, or combinations thereof.

Aspect 17. The method of any one of aspects 1 to 15, wherein the storage system comprises a storage container having a wall with an outer surface, an inner surface, and an open end; and wherein the at least one layer is deposited on the outer surface.

Aspect 18. The method of any one of aspects 1 to 15, wherein the storage system is for storing nuclear material, wherein the storage system comprises a closure lid in sealing engagement with the container; wherein the closure lid has an outer closure lid surface and an inner closure lid surface; and wherein the at least one layer is deposited on the outer closure lid surface.

Aspect 19. The method of any one of aspects 1 to 18, wherein the protective coating provides protection to chemical attack on the substrate.

Aspect 20. The method of aspect 19, wherein the chemical attack is chloride-induced stress corrosion cracking (CISCC).

Aspect 21. A storage container comprising a component with a protective coating produced by the method of any one of aspects 1 to 20.

Aspect 22. The storage container of aspect 21, wherein the storage container is for storing nuclear material.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method for reducing or preventing chemical attack on a substrate, the method comprising depositing nickel particles on at least one surface of the substrate to produce the protective coating, wherein
    the nickel particles are at least 99% pure nickel,
    the protective coating has an area percentage porosity of 0.1% to 1% as determined by ASTM E2109, and
    the nickel particles are deposited by cold spraying a composition comprising nickel particles and a carrier gas.

2. The method of claim 1, wherein the chemical attack is chloride-induced stress corrosion cracking (CISCC).

3. The method of claim 1, wherein the nickel particles are at least 99.5% pure nickel.

4. The method of claim 1, wherein the nickel particles have a Fisher size of about 10 μm to about 500 μm.

5. The method of claim 1, wherein the protective coating has a thickness of about 1 μm to about 1 mm.

6. The method of claim 1, wherein the protective layer has a coating adhesion strength of at least about 9,000 psi as determined by ASTM C633.

7. The method of claim 1, wherein the substrate comprises a storage.

8. The method of claim 7, wherein the storage container comprises a stainless steel storage container.

9. The method of claim 7, wherein the storage container is for storing radioactive waste, fission products, spent nuclear fuel, nuclear fuel material, fissile material, or combinations thereof.

10. The method of claim 7, wherein the storage container has a wall with an outer surface, an inner surface, and an open end; and wherein the at least one layer is deposited on the outer surface.

11. The method of claim 7, wherein the storage container is for storing nuclear material, wherein the storage container comprises a closure lid in sealing engagement with the container; wherein the closure lid has an outer closure lid surface and an inner closure lid surface; and wherein the protective coating is on the outer closure lid surface.

12. The method of claim 7, wherein the storage container is a canister or a cask.

13. The method of claim 1, wherein the carrier gas comprises nitrogen.

14. The method of claim 1, wherein the carrier gas comprises at least 50% by volume nitrogen.

15. The method of claim 1, wherein the carrier gas consists essentially of nitrogen.

16. The method of claim 1, wherein the carrier gas consists of nitrogen.

17. The method of claim 1, wherein the carrier gas has a temperature of from about 800° C. to about 1,200° C.

18. The method of claim 1, wherein the carrier gas has a pressure of from about 1 mPa to about 10 mPa.

19. A substrate comprising a protective coating, wherein the protective coating comprises nickel particles that are at least 99% pure nickel, and wherein the protective coating has an area percentage porosity of 0.1% to 1% as determined by ASTM E2109.

20. The substrate of claim 19, wherein the nickel particles that are at least 99.5% pure nickel.

* * * * *